May 17, 1960     G. G. BAILEY ET AL     2,937,367
DATA HANDLING APPARATUS
Filed July 31, 1956     5 Sheets-Sheet 5
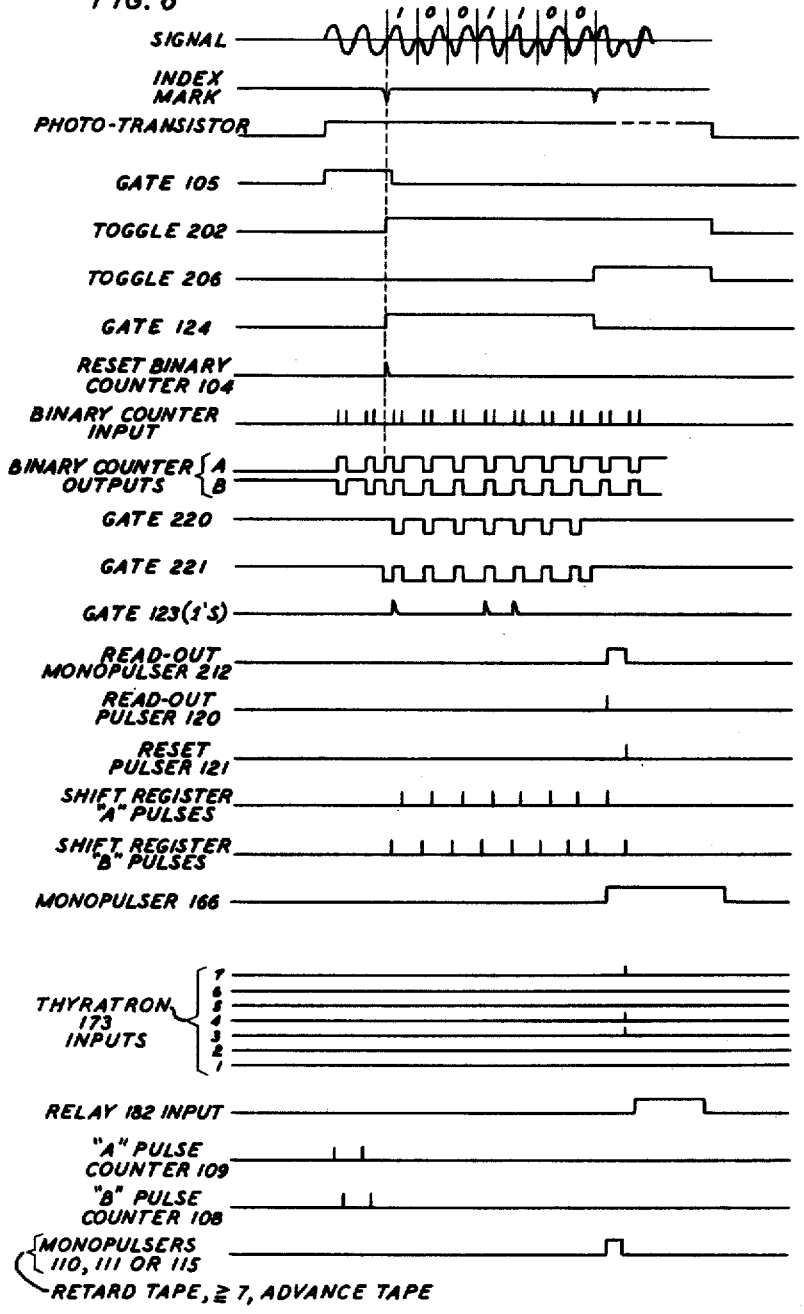

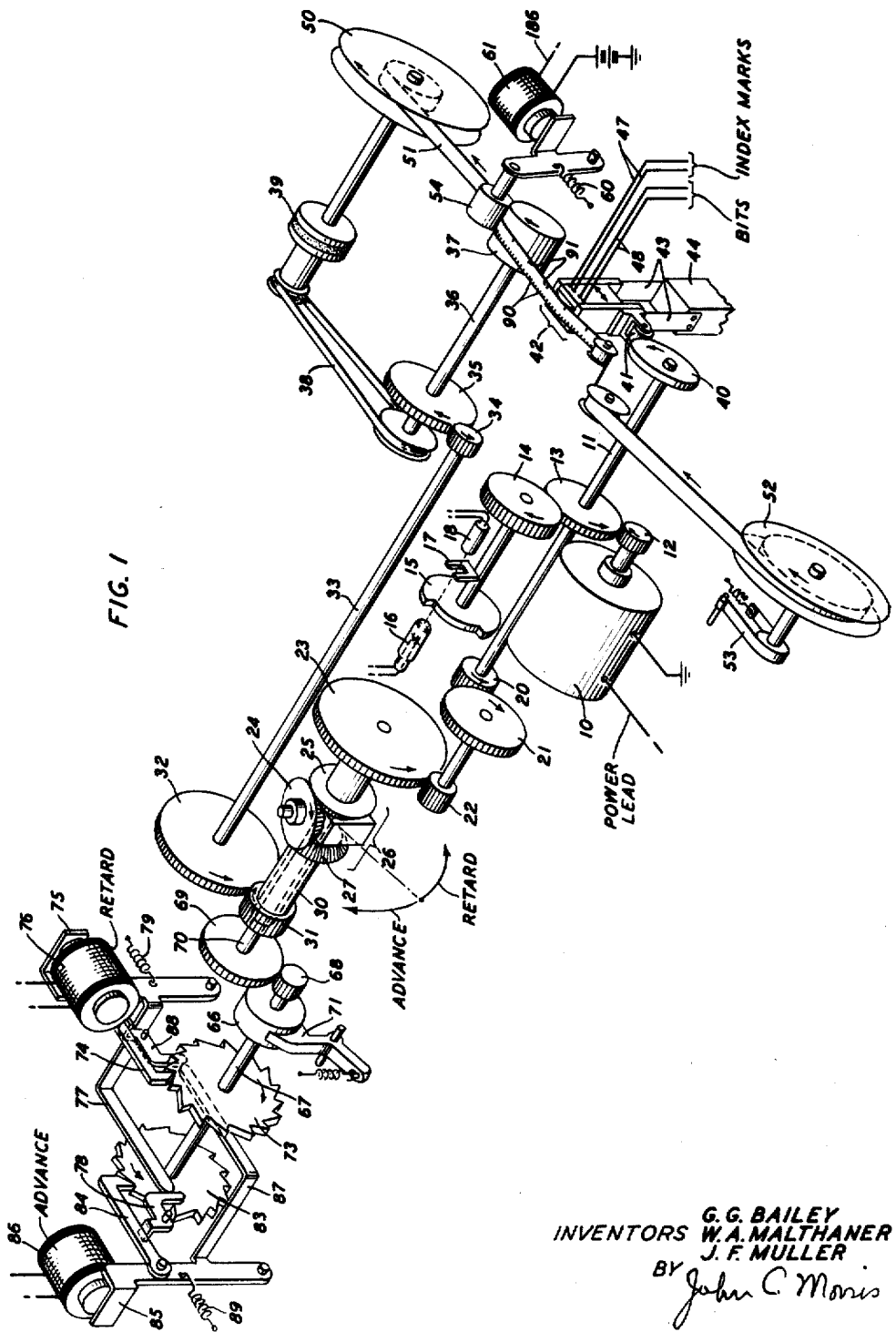

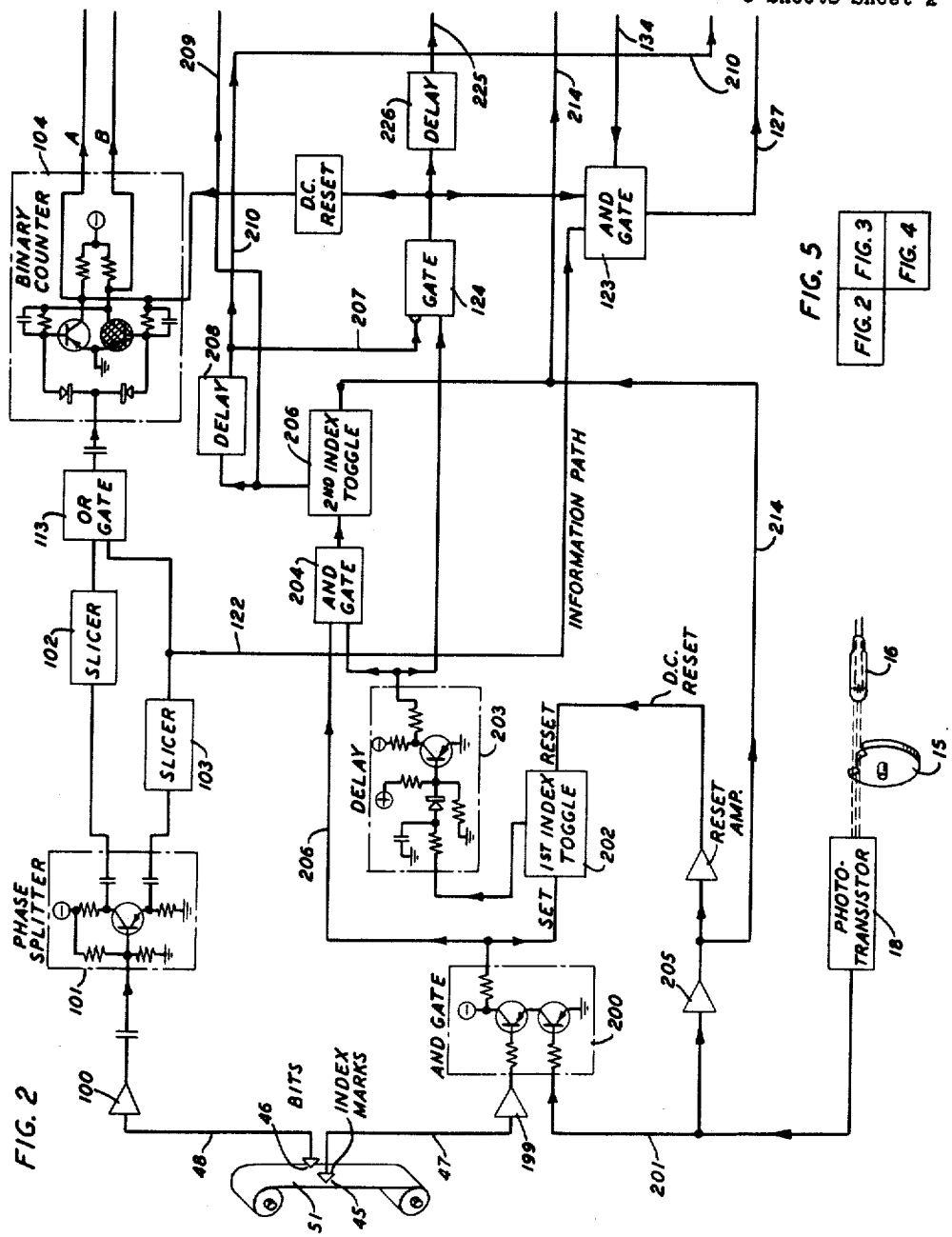

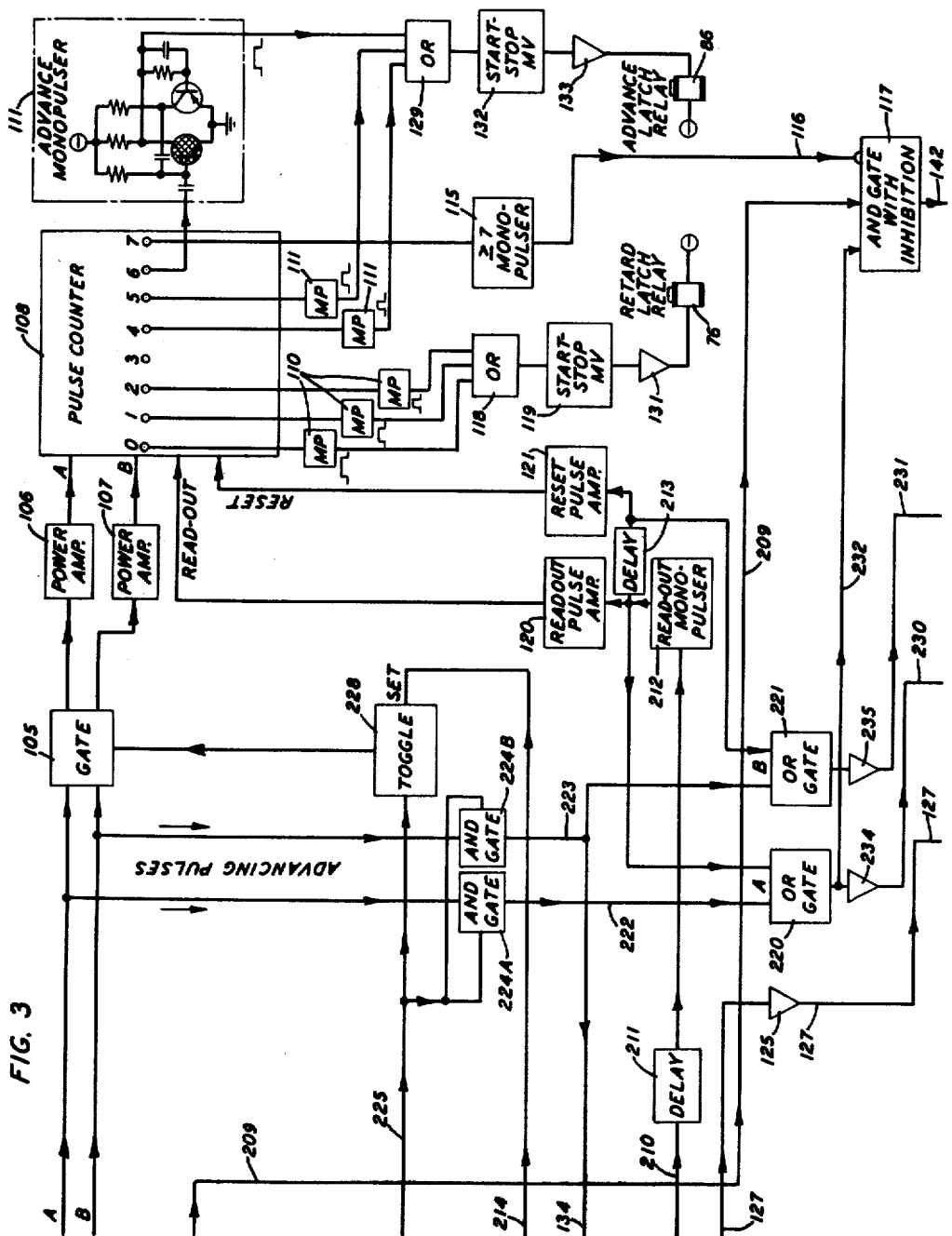

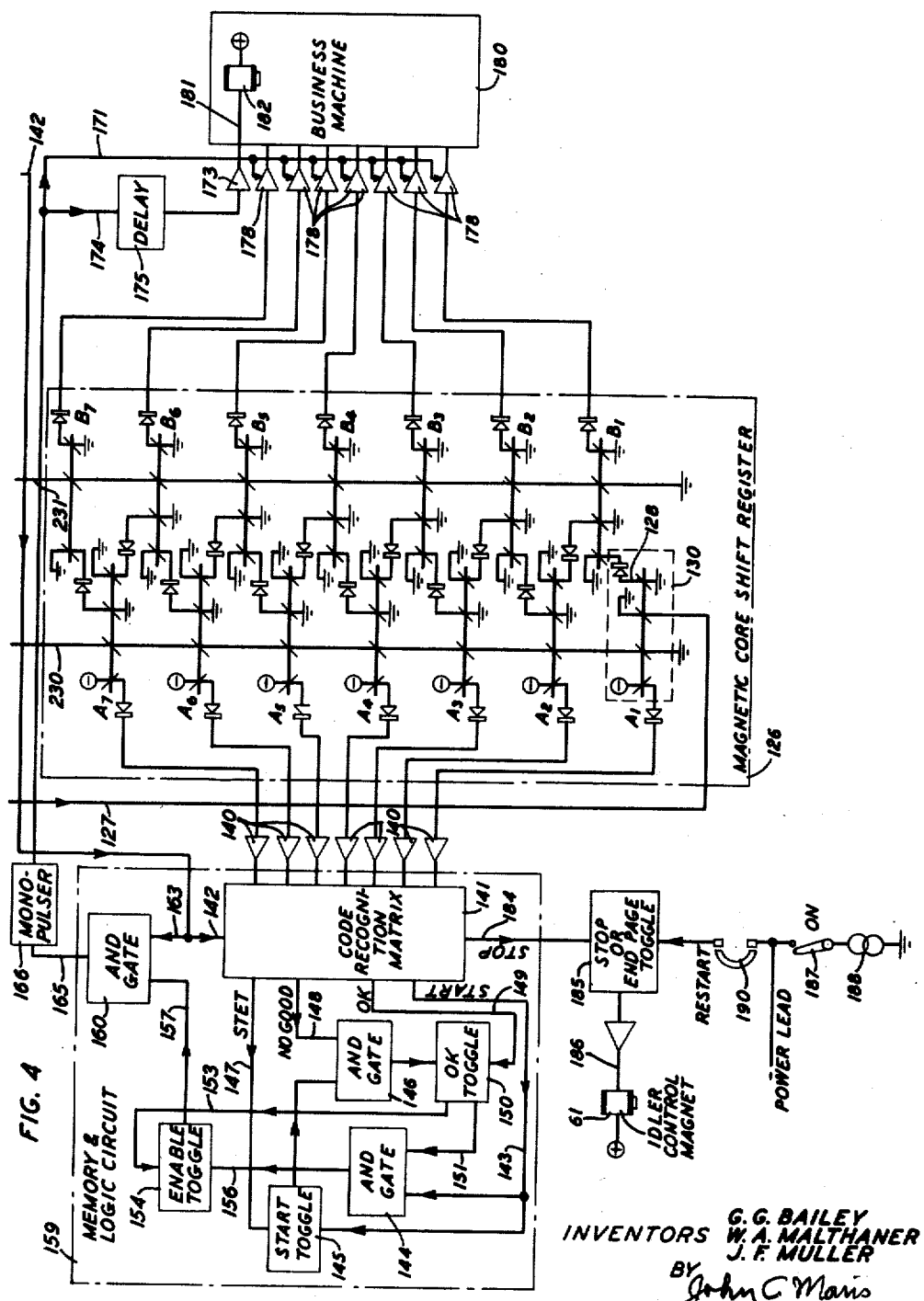

2,937,367
DATA HANDLING APPARATUS

George G. Bailey and William A. Malthaner, New Providence, and John F. Muller, Montclair, N.J., assignors to Bell Telephone Laboratories, Incorporated, New York, N.Y., a corporation of New York Application July 31, 1956, Serial No. 601,302

28 Claims. (Cl. 340—174

This invention relates to information handling systems and more particularly to apparatus for scanning of serially recorded binary code information bits, identifying character groups of the information and converting the information to serially arranged character groups for reproduction.

Employing data transmission systems of the general type disclosed in the patent application Serial No. 560,966, filed January 24, 1956, of G. P. Darwin et al., binary coded information may be transmitted at high speed from one telephone subscriber to another over conventional telephone voice channels to be recorded at the receiving station and ultimately to be reproduced, for example, in printed form. A characteristic of this transmission system is that the rate of information transmission, to wit, 600 bits per second or approximately 85 letters or numerals per second is in excess of the operating speed of manually operated business equipment for introducing information into the system or reproducing the received data. Therefore, it is essential that apparatus be provided for temporary storage of the data at both the sending and receiving stations. A particularly valuable form of information storage is magnetic tape which has the advantages of ease of handling, of low cost and of a form particularly useful in the storage of a single train of continuous or serially arranged discrete information. Apparatus employing magnetic tape for recording and introducing digital information into such systems is disclosed and claimed in the application of Malthaner et al., Serial No. 631,366, filed December 28, 1956.

In contradistinction to the storage and reproduction of continuous waves, such as vocal or musical tones, it is essential in the present type of data transmission system that the several bits, for example, seven making up a single character be scanned, identified and thereafter processed as a single group. Therefore, in addition to the serial storage of information as on magnetic tape, it is also necessary that storage be provided for the individual bits forming a code symbol or character until a total of seven bits is received, examined for the presence of any coded orders and then the entire group advanced simultaneously or in other words in parallel to the displaying or permanently recording equipment.

In order that no information be lost or incorrectly reproduced, it is likewise essential that the data handling apparatus be operative to identify the data despite variations in the data advanced speed, for example, due to slippage or stretch of the magnetic tape, drive motor speed variations, or variations in the bit spacing along the tape.

With these requirements in mind, it is a general object of this invention to effectuate the scanning, identifying, reading, storage and conversion into parallel form of information from a record of serially arranged information bits.

Another object of this invention is to provide, additionally, means for examining an entire code group or character while in storage and, in response to certain code groups, to control the display of the information.

Another object of this invention is to facilitate the error free reading in sequence of recorded blocks of information bits constituting individual characters despite variations in the advance speed of the data.

Still another object of this invention is to enable the automatic correction of errors in the position or average advance speed of the magnetic tape after each character of a record responsive to the relative tape and reading head position detected during the reading of a character.

These objects are attained in accordance with this invention, one specific embodiment of which comprises a magnetic tape transport mechanism including a reading head assembly mounted for oscillation past several characters recorded on an advancing magnetic tape. A photoresponsive assembly limits the utilization of the information scanned by the reading head assembly to the period of highest and also constant relative velocity between the information and the reading head. A counter is connected to count the number of bits in advance of the character to be read during each oscillation and, in response to the count, introduces positional corrections into the tape advance mechanism through a mechanical differential. A shift register is arranged to store temporarily the information bits comprising a single character and connected to the shift register is logic circuitry for examining the character for the presence of certain code combinations of "1" and "0" bits. The logic circuitry is arranged to control the subsequent discharge of each stage of the shift register into reproducing equipment.

One feature of this invention involves the connection of the reading head assembly information output through a gate to the first stage of the shift register and also its connection through a binary counter to each stage of the shift register, as the shift register advancing drive, wherein the gate is made conducting in response to the scanning of an information block identifying mark and made nonconducting in response to the scanning of the next such mark, whereby information constituting a single block is introduced serially into the shift register and advanced therein from stage to stage by pulses from the binary counter.

Another feature of this invention involves the mounting of the reading head assembly for oscillation along the magnetic tape to scan a plurality of recorded characters during each oscillation and the control of the output of the reading head assembly by a photoresponsive element operative only during constant velocity of the assembly in an opposite direction to the magnetic tape movement.

Another feature of this invention involves the reading assembly being connected additionally to a counting device which is operative to count the number of information bits preceding the information block which is read during each oscillation, and, dependent upon the quantity counted, to introduce necessary corrections in the magnetic tape advance.

Another feature of this invention relates to the arrangement whereby the binary counter supplies advance pulses for information within the shift register until a complete character is stored therein whereupon the circuit is operative in response to the index mark following the information to advance the stored information to a code recognition matrix and then to discharge the information in all stages of the shift register simultaneously to a reproducing device.

These and other features of this invention may be understood by reference to the following detailed description and to the drawing in which:

Fig. 1 is a perspective representation of the magnetic tape transport apparatus of this invention;

Figs. 2, 3 and 4 form an electrical schematic representation of this invention;

Fig. 5 illustrates the arrangement of Figs. 2, 3 and 4; and

Fig. 6 is a graphical representation of the operating conditions in order of time of significant portions of the circuitry.

Magnetic tape transport

Referring now to Fig. 1, the tape transport mechanism and reproducing aspects of this invention may be seen as comprising a constant speed motor 10 which drives a main drive shaft 11 through gears 12 and 13. The motor 10, through gears 12, 13 and 14, drives a segmented wheel 15 positioned between a light source 16 on one side and a mask 17 and a photoresponsive element such as a phototransistor 18 on the opposite side. The photoresponsive element 18 is positioned to receive light energy from the light source 16 when the segmented wheel 15 is in the non-blocking position as is shown in the drawing. The motor 10 through main driving shaft 11 is also connected via gears 20, 21, 22 and 23 to the driving gear 25 of a differential 26. The driven gear 27 of differential 26 is secured to a hollow shaft 30 which, through gears 31, 32, shaft 33, and gears 34 and 35, drives a shaft 36 carrying a tape capstan 37. Shaft 36, through belt 38 and slip clutch 39, drives a tape takeup reel 50. The main driving shaft 11 also includes a cam 40 engaging a follower 41 secured to an assembly 42 of two magnetic reproducing heads shown as a single unit and mounted by cantilever spring elements 43 extending upward from the frame 44 of the apparatus. The reproducing heads are permanently aligned side by side so as to allow each to read one of two parallel tracks or paths along a magnetic tape 51. A continuous array of information bits is recorded on one track of tape 51 while index marks are recorded on the other track. The index mark reading head 45 includes output leads 47 while the bit reading head 46 includes output leads 48.

As so arranged, operation of the motor 10 produces rotation of the light interrupter wheel 15, the tape takeup reel 50 and capstan 37 which serves to draw magnetic tape 51 past the reproducing head assembly 42. The motor 10 also serves via the cam 40 to oscillate the assembly 42 in a direction parallel to that of tape travel. The magnetic tape 51 comes from a supply reel 52 mounted for rotation and restrained from free motion by a tape tensioning device 53. The magnetic tape 51 is driven by the capstan 37 when an idler wheel 54 rides against the capstan 37. The idler wheel 54 is normally mechanically biased against the capstan 37 by a spring 60 and is lifted from the capstan upon energization of idler control magnet 61, the energizing source of which is hereinafter described with reference to Fig. 4. The capstan 37 and takeup reel 50, as indicated above, are driven through differential 26. In order to transmit motion from the motor 10 to the capstan 37 and takeup wheel 50, the axis of central gear 24 of the differential must be immobilized. This is achieved by a friction brake 71 applied to a drum 66 on shaft 67 which is in turn connected through gears 68 and 69 to shaft 70 secured to a block carrying central gear 24.

Differential 26 is employed to introduce positional corrections into the magnetic tape drive by adding or subtracting increments of angular rotation through gear 24. Positional correction elements include shaft 67 carrying a pair of escapement wheels 73 and 83. Engaging tape retard escapement wheel 73 is a pawl 74 secured to armature 75 associated with retard solenoid winding 76. Integral with armature 75 is push rod 77 which rotates a rocker arm 78 thereby lifting a pawl 84 engaging tape advance escapement wheel 83. Pawl 84, similar to pawl 74, is rotatably secured to an armature 85 associated with an advance solenoid winding 86. Integral with armature 85 is a push rod 87 which is arranged to rotate rocker 88 thereby lifting pawl 74 whenever winding 86 is energized. With this arrangement, the energizing of either the retard or advance windings 76 or 86 results in both pawls 74 and 84 being disengaged. The pawl of the energized winding is advanced one step and upon release of the energized winding, a return spring 79 or 89 overcomes the friction of brake 71 and imparts through its respective pawl 74 or 84 an increment of rotation of shaft 67. This rotation is transmitted through gears 68 and 69 and shaft 70 to gear 24 of differential 26.

In the case where it was the retard winding 76 which was energized, rotation of gear 24 about the axis of shaft 70 in response to actuation and release of armature 75 reduces the angular degrees of rotation of gear 27 and hollow shaft 30 transmitted to capstan 37 from motor 10. As the actuated armature 75 comes to rest, pawl 74 re-engages its escapement wheel 73 and pawl 84 remains lifted. As the winding 76 is de-energized, the spring 79 returns the armature to its unoperated position and on this return movement the pawl 74 rotates escapement wheel 73 thereby rotating gear 24 and retarding capstan 37 and pawl 84 is re-engaged. When advance winding 86 is energized, similar operation of the armature 85 and pawls 74 and 84 results in advancing capstan 37. These corrective movements actually affect the position of the tape 51. When it resumes movement, its velocity is the same as before. The average velocity, however, has been changed by the momentary retard or advance.

After a corrective change in position of the tape, either advance or retard, the pawls 74 and 84 are again engaged and the motor continues to drive the magnetic tape 51, interrupter wheel 15, and the reproducing head assembly 42 at a fixed relationship of speeds.

Examining the magnetic tape 51 in Fig. 1 in the area of the reproducer head assembly 42 for purposes of illustration, there is shown a series of closely spaced marks 90 or "bits" representing the state of magnetization of the magnetic tape.

Two kinds of marks are used on the magnetic tape. On a background of neutral or unmagnetized tape a short section of the tape is magnetized in one direction, for example, towards positive saturation, to represent a binary "1" indication, or is magnetized in the opposite direction, as toward negative saturation, to represent a binary "0" indication. Each "bit" in the coded information is represented by one or other of these magnetized spots. Each such magnetized spot when read by passing the tape along a reproducing head produces across the head an output voltage whose waveform closely resembles a single sinusoidal cycle having a positive voltage excursion followed by a negative excursion for a "1" signal and a negative excursion followed by a positive excursion for a "0" signal as shown at the top of Fig. 6. On the near side of the magnetic tape 51 in Fig. 1 is shown a second track of magnetic marks 91 at seven times the spacing of the information bit marks. These marks, all binary "1" indications or alternatively all "0" indications, are index marks positioned halfway between adjacent bits on the information track and mark off as a single letter or code designation each group of seven information marks between two successive index marks. The output voltage of the index mark reproducing head is reshaped and amplified to produce sharp voltage spikes as shown in Fig. 6.

As shown in Fig. 1, a two track magnetic tape is disclosed. It is within the purview of this invention, however, to employ any arrangement of index marks and information bits recorded on a single area of tape with provision in the reading head assembly for distinguishing between the information bits and index marks. As an example of such an arrangement, the character and index reading heads may each be oriented at a forty-five degree angle with respect to magnetic tape and ninety degrees with respect to each other. The recording heads used to prepare the magnetic tape should be mounted in the same manner. The recorded information and index marks will appear at right angles to each other on the single width of magnetic tape and each reproducing head will be responsive only to recorded signals oriented at the same angle as that reproducing head.

Referring now to Figs. 2, 3, 4, and 6, an understanding may be had of the handling of information scanned on the apparatus of Fig. 1. The information scanned making up a typical character is labeled in Fig. 6 as the signal, constituting tandem sinusoidal variations in reproducing head output voltage. Index marks appear in Fig. 6 as negative voltage spikes. Bits scanned by the information reading head 46 are transmitted through leads 48 through amplifier 100 and are applied to a phase splitter 101, for example, a conventional split load transistor phase inverter having the collector electrode connected to the input of a pulse former or slicer 102 which produces a negative square pulse for each negative excursion of the signal voltage, and having the emitter electrode of phase splitter 101 connected through to the input of a slicer 103 which produces a negative square pulse for each positive excursion of the signal voltage. The output of both slicers 102 and 103 is combined in an OR gate 113 producing two negative rectangular voltage pulses for each bit scanned regardless of its "1" or "0" representation. Briefly, the circuit between the output of amplifier 100 and the output of OR gate 113, comprising phase splitter 101, slicers 102 and 103, and OR gate 113 forms a full wave rectifier arrangement having negative pulse outputs.

*Magnetic tape position or speed correcting circuitry*

The OR gate 113 is connected to a binary counter 104 which comprises a conventional two-transistor bistable multivibrator or toggle with the input connected via diodes to each transistor so that the state of the toggle is reversed on each input pulse. Thus, the pair of input voltage pulses for each bit signal, by operating and resetting the binary counter toggle, produces positive pulses alternately on leads A and B, hereinafter described as the A and B pulses.

The A and B leads of binary counter 104 are connected to a normally closed or nonconducting gate 105 which, in turn, through power amplifiers 106 and 107, has its output leads connected to an eight position bit counter 108. As so arranged, pulses on the A and B leads, when introduced into the counter 108, are used to drive a reference pulse from the "0" position to any of seven other sequential positions in one-to-one correspondence with the number of pairs of A and B pulses which reach the counter 108 during the time that gate 105 is open or conducting. If more than seven pairs of A and B pulses are introduced into the counter, it remains in the position reached on the seventh pair. Connected to the positions termed "0," "1" and "2" in the counter 108 are individual one-shot multivibrators or monopulsers 110, which are combined in an OR gate 118 and serve to trigger a start-stop multivibrator 119 which is in turn connected through a power amplifier 131 to retard winding 76 of Fig. 1 to a power source. The position labeled 3 in magnetic core counter 108 has no output. Connected to the positions labeled 4, 5, and 6 of the counter 108 are individual one-shot multivibrators or monopulsers 111. These monopulsers 111 are combined in OR gate 129 which is connected to a similar start-stop multivibrator 132 connected through a power amplifier 133 and to advance winding 86 of Fig. 1 to a power source. Connected to the position labeled 7 is a monopulser 115 the output of which is connected as an inhibition input lead 116 of an AND gate 117. The monopulsers 110, 111, and 115, of which the advance monopulser 111 is typical, each comprise a two-transistor grounded emitter multivibrator with alternating-current coupled input as shown in Fig. 3. The counter 108 includes as an additional input a read-out pulse source 120, which, as its name implies, is energized at the time when the position of the advanced pulse in the counter 108 is to be read. A reset pulse source 121 also is connected to the counter 108 and serves to reset the reference pulse to the "0" position after readout.

*Information path*

In addition to the connection of the input from the bit reproducing head 46 through the OR gate 113, the positive-signal half of each bit information pulse from the slicer 103 is introduced via lead 122 as the input to an AND gate 123 in the information path of the apparatus. This gate 123 which is normally closed or nonconducting has an enabling lead from a gate 124 in the index mark reading head circuit and an input 134 which is enabled during the first half of each bit information pulse by AND gate 224B hereinafter described. The output of AND gate 123 which occurs only on "1" information bits, i.e., a signal which as scanned has a positive excursion first, is through an amplifier or pulser 125 via lead 127 to an input winding of the $A_1$ core of a magnetic core shift register 126. An output winding of the $A_1$ magnetic core is connected through lead 128 and a suitably poled diode to an input winding of the $B_1$ core. An output winding of the $B_1$ core in the same manner is connected to an input winding of the $A_2$ core with the remaining core elements coupled in this alternate series order. The A advance lead 230 is coupled to all of the A cores so as to advance the "1's" present to the next succeeding B stage. The B advance lead 231 is coupled to all of the B cores similarly to advance any "1's" in those stages to the next A stage.

By use of the information path just described and the action of the A and B advance leads 230 and 231 as hereinafter further described, a serial pulse train of "1" and "0" signals from the magnetic tape are registered in the magnetic core register 126 from which they are discharged simultaneously or in parallel first to memory and logic circuit 159 for control purposes and then to business machine 180 for reproduction.

*Information reproduction control*

The B stages each have an individual output winding connected to a respective thyratron amplifier 178. The amplifiers 178, which have an enabling lead 171, are connected to a business machine 180.

Each A stage magnetic core has a second output winding connected through individual amplifiers 140 to a conventional diode logic-matrix code recognition circuit 141. The code recognition circuit 141 has an enabling lead 142 from AND gate 117 and five output leads. Output lead 149 labeled "OK" serves to energize toggle 150 indicating the presence of a signal in the shift register 126 signifying that the information following is error free. Toggle 150, which is representative of all the toggles disclosed, is a bistable transistor multivibrator of the general type disclosed in the Patent 2,569,345 to R. F. Shea, issued September 25, 1951. The term "toggle" is used to denote the similarity in function to the conventional toggle switch. Toggle 150 furnishes one input to AND gate 144 over lead 151. A second output lead from matrix 141 is "start" lead 143. A "start" signal normally follows the "OK" signal and signifies the beginning of transmission. Lead 143 serves to turn on "start" toggle 145 and supply one enabling lead to AND gate 144 which thereupon turns on "enable" toggle 154 via lead 156, thereby supplying one enabling input to AND gate 160 via lead 157. Input lead 163 to AND gate 160 is connected to lead 142 so that gate 160 may be enabled over lead 157 whenever the entire code recognition matrix 141 is enabled. An additional output from matrix 141 is lead 148 labeled "no good" which constitutes the second enabling lead to AND gate 146 thereby turning "OK" toggle 150 off which, in turn, does the same to "enable" toggle 154 and, through gate 160, removes the enablement from the thyratrons 178 so that information following does not reach the business machine 180. The lead 148 is active when the code matrix detects the code combination indicative that the information following includes an error and should be omitted since the corrected line of information was repeated and followed this line in transmission. Actually, as the magnetic tape 51 is read, the corrected line appears first followed by the "no good" code and then the line containing an error since the last received material is reproduced first.

In the case where "stet" output lead 147 received a pulse from matrix 141 preceding a pulse on the "no good" lead 148, the toggle 145 is converted to the off state, one enabling lead to AND gate 146 is removed and the "no good" signal is ineffective to turn toggle 150 off. This sequence indicates that an error occurred in the message as received but was uncorrectable and the line should be printed with the error and a special symbol indicating the presence of an error. These aspects of error detection, checking and recording of code signals are described in more detail in the copending application of G. P. Darwin et al, cited above.

One additional output of matrix 141 is "stop" or "end of page" lead 184 which, as its name implies, is operative upon the recognition of such a code combination to reset toggle 185 terminating the advance of magnetic tape 51 by energizing winding 61 as seen in Fig. 1.

Considered as a unit, code recognition matrix 141, gates 144, 146, 160 and toggles 145, 150 and 154, enclosed in a dot-dash line in Fig. 4, constitute memory and logic circuit 159 arranged to monitor information in the shift register 126 and control the reproduction of such information by the business machine 180. This memory and logic circuit 159 has an enabling input lead 142, an information input through amplifiers 140, a "print" output lead 165, and a "stop" output lead 184.

The "print" output lead 165 through a monopulser 166 enables thyratrons 178 through lead 171 in order that they will fire in accordance with the outputs of the B cores of shift register 126 and operate the appropriate key selecting relays in the business machine 180 which, for example, may be an automatic typewriter such as a model FPC8A Flexowriter manufactured by the Commercial Controls Corporation. A thyratron 173 activated by "print" output lead 165 through lead 174 and delay network 175 is arranged to operate a relay 182 in business machine 180 thereby utilizing the information received via thyratrons 178. In the case where a Flexowriter is used as the output device, the relay 182 operates the key which was selected in accordance with the thyratrons 178.

The "stop" output lead 184 of logic circuit 159 turns on toggle 185 in the power circuit of idler control magnet 61. Toggle 185 is arranged to be turned off by the closing of a switch 187 which applies power from source 188 via lead 189 to motor 10 of Fig. 1. The power circuit of motor 10 includes a push button switch 190 which is connected to reset toggle 185 after it has been set or turned on through lead 184.

*Scanning control circuitry*

Referring again to Fig. 2, the index mark reading head 45 having output lead 47 is connected through amplifier 199 to the base electrode of one transistor in a two-transistor AND gate 200. The base electrode of the second transistor is connected through lead 201 to the output of phototransistor 18 arranged to be energized in response to light from lamp 16 passing through interrupter wheel 15. The transistors of gate 200 are series-coupled collector to emitter in a conventional manner so that both transistors must be in the conducting state for the gate to conduct thereby producing an output at the collector of the upper transistor. This occurs when simultaneous negative pulses appear upon both lead 201 and the output lead of amplifier 199. Thus, gate 200 will produce an output pulse for each index mark read during the energized period of phototransistor 18. The output of gate 200 is connected as the set or "on" input of a toggle 202 and as one input to AND gate 204. The output of toggle 202 is connected to a delay network 203 comprising an RC network and a series Zener diode connected to the base electrode of a transistor operated as a switch.

The phototransistor 18, in addition to its connection to gate 200, supplies the set voltage for toggle 228 which controls gate 105, and serves to supply upon its de-energization through amplifier 205 and lead 214 the reset voltages for toggles 202 and 206, hereinafter described. With this arrangement, the information read by the bit and index reading heads is introduced into the system by opening of gates 200 and 105 during the period when the phototransistor 18 is energized, or in another sense, only in the period during which the relative velocity of the reading head assembly 42 with respect to the moving magnetic tape 51 is constant and at its highest value.

Delay network 203 is connected as one input to AND gate 204, the other input coming directly from gate 200 through lead 206. The delay circuit 203 retards the enablement of gate 204 sufficiently that the first index mark pulse to pass gate 200 and used to operate toggle 202 is completely removed by the time this enablement occurs. The first output of gate 204 occurs when the second index mark is read during the energized period of phototransistor 18 and operates toggle 206 which is therefore termed the second index toggle. Delay network 203 is also connected as the enabling input to an AND-NOT gate 124, the inhibiting input of which comprises lead 207 from a delay network 208 connected to toggle 206. The delay networks 203 and 208 pass pulses which act to produce an output from gate 124 upon the operation of toggle 202 and to terminate the output upon the operation of toggle 206, each action delayed as a function of the time constants of the RC network, the breakdown voltage of the Zener diode in the base circuit of the transistor switch and the bias supplied at the junction between the Zener diode and the base electrode of the transistor, all shown, for example, in the box labeled delay 203. Network 208 through lead 210 and delay network 211 is connected to a transistor monostable multivibrator or monopulser 212 which through amplifiers 120 and 121, respectively, provides a read-out pulse directly to the counter 108 and a reset pulse through delay network 213 to counter 108. Monopulser 212 is connected directly to an OR gate 220 for the A advancing pulses of shift register 126 and through delay network 213 to OR gate 221 for the B advancing pulses of shift register 126. The second inputs to gates 220 and 221 are leads 222 and 223, respectively, from AND gates 224A and 224B, respectively, each having an enabling lead 225 from gate 124 through a delay network 226. The A pulses from binary counter 104 passing through gate 220 are amplified in current amplifier 234 and introduced through lead 230 into all A stages of shift register 126. Similarly, gate 221 is connected through current amplifier 235 via lead 231 to all B stages of shift register 126. The gate 220, in addition to passing the A advance pulses to the shift register, provides via lead 232 an input lead to AND gate 117.

*Operation*

In operation, reel 52 of the apparatus in Fig. 1 is first loaded with magnetic tape 51 having digital information recorded thereon such as the signals received by a telephone subscriber using the system of the G. P. Darwin et al. application identified above. The tape 51 is threaded over the drive and reading apparatus and onto reel 50. Next, power switch 187 is closed energizing motor 10, lamp 16, supplying necessary power to the control circuitry, and activating business machine 180. With center gear 24 of differential 26 held in a fixed axial position, the tape is advanced at a constant rate by the motor 10 through the gearing described above and the reading head assembly is oscillated by cam 40 at a fixed oscillation frequency. Interrupter wheel 15 is rotated by motor 10 similarly at a constant rate. Light from lamp 16 reaches phototransistor 18 during part of each revolution of wheel 15 and more exactly during about one hundred degrees of the wheel in a selected portion of the period of oscillation of reading head assembly 42 when the velocity of the reading head is constant and opposite to that of magnetic tape 51. This relationship between reading head assembly and shutter wheel depends on the size of the cutout portion of wheel 15, the ratio of gears 13 and 14 (one to one), the shape of cam 40 and the mechanical phasing of the wheel and cam. Cam 40 is advantageously designed to produce linear change in transverse displacement of assembly 42 with respect to angular rotation of shaft 11. The relative speed of the assembly 42 past the moving tape 51 is constant over the greatest part of travel both with and opposed to the direction of tape travel.

The phototransistor 18 is energized through wheel 15 only during the time of travel of the assembly 42 at uniform velocity and in opposition to the direction of travel of the magnetic tape 51. During that period, the highest voltage is generated by the reading heads since, as it is well known in the art, the voltage induced in the winding of a reading head is proportional to the algebraic sum of velocities of the head and the recorded medium.

Information bits, as represented by the signal in Fig. 6, are transmitted continuously via leads 48 through amplifier 100 to phase splitter 101 where they are introduced into slicer or pulse former 103 directly and in inverted form into slicer 102. Slicers 102 and 103 each produce a rectangular pulse for each positive excursion of its input signal substantially free from any amplitude variation due to noise or other disturbance in the recorded signal. The rectangular pulses are recombined in OR gate 113 as two pulses per bit and introduced into binary counter 104. The output of binary counter 104 is a rectangular voltage pulse on both leads A and B for each information bit recorded on the tape 51 regardless of whether the bit is a "1" or a "0." The pulses from binary counter 104 are conducted to gates 105 and 224 both of which are normally closed. When phototransistor 18 is energized, its amplified output opens gate 105 through the operation of toggle 228, and A and B pulses are arranged to advance an index pulse within counter 108 to the succeeding positions "1" through "7" from an initial "0" position. During this counting operation, the index mark head is scanning the second track for index marks. If none is encountered for seven bits or more, the counter 108 when energized on its read-out lead produces a pulse in the "7" output lead to monopulser 115 which inhibits gate 117 from opening. Gate 117 must be open for the thyratrons 178 to fire and business machine 180 to operate. With this arrangement, any group of seven or more information bits without a second character mark is not reproduced and so may be used for control purposes in a tape information transmission system such as the G. P. Darwin et al. application identified above. When an index mark is read, the resultant voltage pulse shown in Fig. 6 through gate 200 enabled by the output of phototransistor 18 sets toggle 202 and, after a delay via network 203 slightly longer than the duration of the index mark pulse, produces an output pulse at gate 124 which is normally enabled by toggle 206. The output of gate 124 resets the binary counter 104, supplies one enabling input of AND gate 123 in the information path, and through delay 226 enables AND gate 224 and resets toggle 228 thereby closing gate 105. Resetting of binary counter 104 and closing gate 105 terminates the introduction of A and B pulses to counter 103 thereby storing an indication of the number of information bits preceding the first scanned index mark. The counter 108 remains inactive during the introduction of information into the shift register 126 but after that time it serves to initiate positional corrections into the tape drive system as described hereinafter.

At the same time that gate 105 is closed, AND gates 224 A and B are opened. A and B pulses from binary counter 104 are admitted through OR gates 220 and 221 and into shift register 126 as information advancing pulses. The "1" signals in the information bit output of slicer 103 are identified by their time coincidence with the B outputs of gate 224B, the AND gate 123 now enabled by toggle 202 through gate 124. These "1" signal outputs produced by gate 123 are repeated by pulser 125 in proper voltage and waveform as the information input to the $A_1$ stage 130 of shift register 126 to be advanced to the $B_1$ stage by the A advancing pulse from lead 230 and successively to be advanced to the $A_2$ by the next B advance pulse over lead 231 at which time the second information bit if a "1" is introduced into the $A_1$ stage. When the seventh successive bit has been examined in gate 123 as a possible input to the $A_1$ stage of register 126, the index mark immediately following on the tape produces a pulse which passes through gate 200 and gate 204 to set second index toggle 206. The operation of toggle 206 closes AND-NOT gate 124 by removal of one enabling input through delay 208, energizes the monopulser 212 through additional delay 211, and supplies one input to gate 117. Operationally, the reading of the second index mark in closing gate 124 also closes gate 123 immediately and, after a delay, closes gate 224. The closing of gate 123 terminates the input to the shift register 126 of information from slicer 103. Monopulser 212 advances the information in the $A_1$ through $A_7$ stages to the code recognition matrix 141 and supplies the second enabling input to AND gate 117, thereby enabling the logic circuit over lead 142. The "1" information in any of the A stages then serves to energize amplifiers 140 connected to those stages whereupon matrix 141 and logic circuit 159 controls the utilization of the information in the shift register 126. In the event that the combination of bits designated as the "stop" code is detected by matrix 141, toggle 185 is opened stopping the tape by energizing magnet 61 shown also in Fig. 1.

Monopulser 212, in addition to providing an A advance pulse for shift register 126 and read-out pulse for counter 108, after a delay provides a B advance pulse and resets counter 108 to the "0" position. The B advance pulse advances the character bits simultaneously or in parallel into the business machine 180 provided the thyratrons 178 and 173 are enabled by the logic circuit 159 through AND gate 160. The business machine 180 receives the character in a parallel array of bits in condition for use thereby, e.g., reproduction on a printed page.

At the moment that the information in shift register 126 was advanced to code recognition matrix 141 by the A advance pulse from monopulser 212, the count in counter 108 was read out by a pulse from amplifier 120 and, at the moment that the information in the shift register is discharged into business machine 180 by the delayed pulse from monopulser 212, the index pulse in counter 108 was reset to the "0" position by amplifier 121. If the index pulse remained at the "0" position or had been advanced to the "1" or "2" positions, the retard monopulser 110 associated with that position would be activated upon the operation of read-out amplifier 120, operating multivibrator 119 for three, two, or one cycles, respectively, thereby energizing the retard latch winding 76 the same number of times. Each time the winding 76 is energized, pawl 74 is advanced to the next step of the escapement wheel 73. Upon release of the winding 76 after each input pulse, pawl 74 is returned by spring 79 and escapement wheel 73 is rotated clockwise as shown in the drawing. The rotation through differential 26 is substracted from the driving system of capstan 37 retarding the magnetic tape by about one information bit for each operation of armature 75.

In the event that the index pulse in counter 108 was advanced to positions "4", "5" or "6", the appropriate advance monopulser 111 would be activated responsive to the read-out pulse and through OR gate 129 operating start-stop multivibrator 132 for the number of cycles necessary to reset the magnetic tape to its optimum or "3" position. Multivibrator 132 through power amplifier 133 energizes advance relay winding 86 the appropriate number of times. Similar to the case of retarding the magnetic tape, the pawl 84 secured to the actuated armature 85 is advanced to the next stop of the escapement wheel 83. Upon the release of winding 86, pawl 84 rotates escapement wheel 83 in a counterclockwise direction adding angular rotation to the magnetic tape drive thereby advancing the tape about one information bit. In this manner, the position of the magnetic tape is correctable following each seven bit group. The positional correction also may be regarded as a change in average velocity of the tape but without the disadvantage of any change in velocity occurring during the information scanning cycle.

As just described, tape position or average velocity corrections are made in accordance with the number of information bits preceding the information group read. Other arrangements are possible within the scope of this invention. For example, the number of scanned bits which follow the character group during each oscillation of the reading head assembly 42 may be counted and, in accordance with that count, speed corrections may be made. Similarly both the number of bits preceding and following the character group may be counted, the difference obtained and employed to effect speed corrections. To effect the former modification, the set input of toggle 228 which controls the opening and closing of gate 105 is connected to lead 210 for opening that gate after the second index mark and the reset input to toggle 228 is connected to amplifier 205 of Fig. 2 whereby the gate 105 will be closed at the end of each scan cycle as phototransistor 18 is de-energized. In order to hold the information scanned in shift register 126 until the counting step is completed, read-out monopulser 212 also is connected through delay 211 to amplifier 205. Then read-out of information will occur after phototransistor 18 is de-energized.

Where it is desired to make tape position corrections responsive to the difference in number of bits preceding and following the character group, the bits preceding the first character mark are counted as in the circuit of Figs. 2 and 3. However, the set lead of toggle 228 is also arranged to be responsive to the second index toggle 206 to reopen gate 105 after the character group is scanned and remains open until a second reset pulse is derived preferably from amplifier 205. Responsive to the second index toggle 206 the power amplifiers 106 and 107 should also be connected to the counter 108 to reverse its direction of count. Thus, the reference pulse which was advanced by bits preceding the character group would be returned by bits following the character group. The final position of the reference pulse indicates the difference in number of bits preceding and following the character group. As is the case with the counter 108 output as shown in Fig. 4, if the reference pulse comes to rest at an optimum stage, no speed correction is made, or if it comes to rest in stages to one side or the other of the optimum value speed corrections are effected via monopulsers 110, 111 or 115.

Operating under optimum conditions, the tape is advanced one character per oscillation of the reading head so that each successive character group to be read always appears at the same relative position within the phototransistor energized period. Under these conditions, after initial phasing line-up, each character to be read is always preceded by three bits and an index mark, and is followed by a second index mark and several more bits. If the character position varies by so much as a single bit, the variation is detected by the counter 108 and positional corrections are introduced into the tape drive by differential 26. As shown, any error in speed of the magnetic tape of as much as plus or minus forty percent will be corrected without any loss or duplication of information.

It is to be understood that the above-described arrangements are illustrative of the application of the principles of the invention. Numerous other arrangements may be devised by those skilled in the art without departing from the spirit and scope of the invention.

What is claimed is:

1. Digital data handling apparatus comprising a record of serial groups of serially recorded discrete information bits separated by group identifying marks, a scanning assembly positioned to scan information and group identifying marks on said record and mounted for oscillation along said record, means for oscillating said scanning assembly over at least a single group of bits, means for advancing said record past said scanning assembly, an information bit counter, a multiple stage shift register, pulse generating means, said scanning assembly being connected to said counter through a first gate, to said shift register through a second gate, and to said pulse generating means so that a single output pulse from said last means is provided for each bit scanned, means for enabling the opening of said gates only during a discrete portion of the travel of said scanning assembly in a single direction, said scanning assembly being responsive to the first scanned group identifying marks for closing said first gate thereby introducing into said counter only the information bits preceding the first group identifying mark, and means controlled by said counter for introducing corrections into the average speed of said record advancing means dependent upon any variation from a normal value of the quantity of bits introduced into said counter, said scanning means also being responsive to the first group identifying mark for opening said second gate and responsive to the next following group identifying mark for closing said second gate whereby a single complete information group is introduced into said shift register during each oscillation of said scanning assembly, said pulse generating means being connected to each stage of said shift register to advance bits introduced therein.

2. Digital data handling apparatus comprising a record of serial groups of serially recorded discrete information bits separated by group identifying marks, means for scanning the information bits and group identifying marks, means for oscillating said scanning means over more than a single group of information bits, means including a motor for advancing said record past said scanning means, a multiple stage shift register, the first stage of said shift register connected to said scanning means through a gate, and switch means responsive to the scanning of a group identifying mark on said record for opening said gate initiating the serial introduction of information into said shift register, said switch means also responsive to the scanning of the next following group identifying mark on said record for closing the gate thereby allowing the introduction of a single complete information group into said shift register.

3. The combination in accordance with claim 2 wherein a logic circuit is connected to a plurality of stages of said shift register and responsive to the presence or absence of particular code combinations in the information contained therein disabling or enabling shift register output connections.

4. The combination in accordance with claim 3 wherein the switch means of said apparatus is also operative in response to the second group identifying mark on said record for enabling said logic circuit whereby information introduced into said shift register is examined by said logic circuit and discharged to the outputs of said shift register only when the information comprises a complete group preceded and followed by group identifying marks.

5. Digital data handling apparatus comprising a record of serial groups of serially recorded discrete information bits separated by group identifying marks, first scanning means mounted for reading the information bits, second scanning means mounted for reading the group identifying marks, means including a motor for advancing said record past said first and second scanning means, means for repeatedly passing said first and second scanning means over more than a single group of information bits, a multiple stage shift register, the first stage of said shift register connected to said first scanning means through a gate, and switch means responsive to the reading of a first group identifying mark on said record by said second scanning means for opening said gate initiating the serial introduction of information into said shift register, said switch means also responsive to the reading of the next following group identifying mark on said record by said second scanning means for closing the gate thereby completing the introduction of a single complete information bit group into said shift register.

6. The combination in accordance with claim 5 wherein said apparatus includes a counter connected to count information read by said first scanning means and means for correcting the speed of said record in response to variations from a normal value to a quantity of periods counted by said counter.

7. Digital data handling apparatus comprising a record of serial groups of serially recorded discrete information bits separated by group identifying marks, a scanning assembly positioned to scan information and group identifying marks on said record and mounted for oscillation along said record, means for oscillating said scanning assembly over greater than a single group of bits, means including a motor for advancing said record past said scanning assembly, a multiple stage shift register, said scanning assembly connected to a first stage of said shift register through a gate, switch means responsive to the scanning of a group identifying mark on said record for opening said gate initiating the serial introduction of information into said shift register, said switch means also responsive to the scanning of the next following group identifying mark on said record for closing the gate thereby allowing the serial introduction of a complete information group into said shift register, and a logic circuit connected to a plurality of stages of said shift register and responsive to the presence or absence of particular code combinations in the information contained therein disabling or enabling the shift register output connections.

8. Digital data handling apparatus comprising a record of serial groups of serially recorded discrete information bits separated by group identifying marks, means including a motor for advancing said record, a scanning assembly positioned to read information and group identifying marks on said record and mounted for oscillation along said record, means for repetitively passing said scanning assembly over a section of said record greater than a single group of bits, a multiple stage shift register, said scanning assembly connected through a gate to the first stage of said shift register, photoresponsive means for enabling the opening of said gate only during a discrete portion of the travel of said scanning assembly in one direction, said gate being opened responsive to the scanning of a first group identifying mark and closed responsive to the next following group identifying mark whereby a single complete information group is introduced into said shift register during each oscillation of said scanning assembly.

9. The combination in accordance with claim 8 wherein the motor is arranged to advance the record one group during each passage of the scanning assembly whereby successive information groups are introduced into the shift register.

10. The combination in accordance with claim 8 wherein said photoresponsive assembly comprises a light interrupter wheel coupled to said oscillating means, a light source and a photoresponsive element positioned to be energized by said light source when not interrupted by said light interrupting means, said photoresponsive assembly connected as an opening input to said gate.

11. The combination in accordance with claim 8 wherein said photoresponsive means is operative to open said gate only during the period of motion of said scanning means in opposition to the direction of information advance on said display.

12. The combination in accordance with claim 10 wherein said gate is openable only upon the coincident energizing of said photoresponsive assembly and the scanning of a first group identifying mark whereby information is introduced into said shift register only during the period of velocity of said scanning means in a direction opposite to the movement of said record and after the scanning of a group identifying mark.

13. The combination in accordance with claim 12 wherein said apparatus includes a logic circuit connected to said shift register and responsive to the presence or absence of particular code combinations in the information contained therein enables or disables the shift register output.

14. The combination in accordance with claim 13 wherein said apparatus includes switch means responsive to the scanning of the second group identifying mark during each oscillation of said scanning assembly for enabling said logic circuit.

15. Digital data handling apparatus comprising means for advancing a record of serial groups of serially recorded discrete information bits separated by group identifying marks, a scanning assembly comprising a first reading head mounted to scan information on the record and a second reading head mounted to scan the group identifying marks on the record, means including a motor for oscillating said scanning assembly at a substantially constant velocity in the direction of record advance over a distance greater than the length of a single group of information bits, a multiple stage shift register, a coincidence gate connecting said first reading head to one stage of said shift register, means for providing one enablement input to said gate during the constant velocity period of said scanning assembly, said second reading head being responsive to a group identifying mark for providing a second enablement input to said coincidence gate whereby information scanned by said first reading head is introduced into said shift register during constant velocity of said scanning assembly and after a first group identifying mark.

16. The combination in accordance with claim 15 wherein said second reading head is responsive to the next following group identifying mark closing said gate to terminate the introduction of information into said shift register.

17. The combination in accordance with claim 15 wherein said apparatus includes means connected to said first reading head for generating a pulse for each bit scanned, and for introducing the pulse into each stage of said shift register to advance information stored therein.

18. The combination in accordance with claim 15 including means responsive to the scanning of the next following group identifying mark for advancing information in said shift register and for discharging the information from the shift register outputs after the closing of said coincidence gate.

19. The combination in accordance with claim 18 wherein logic circuitry is connected to a plurality of stages of said shift register to examine a complete character group simultaneously and in response to the presence or absence of a code combination in said character group enabling the simultaneous discharge of information from all stages of said shift register.

20. Digital data handling apparatus comprising a record of serial groups of serially recorded discrete information bits separated by group identifying marks, means including a motor for advancing said record, a scanning assembly positioned to read information and group identifying marks on said record and mounted for oscillation along said record, means for oscillating said scanning assembly at a frequency approximately equal to the advance rate of said information groups and at a predetermined velocity over the major range of displacement during oscillation, an information bit counter connected to said scanning assembly through a first gate, a multiple stage shift register connected to said scanning assembly through a second gate, means for enabling the opening of said gates only during the predetermined velocity travel of said scanning assembly, said scanning assembly being responsive to a first occurring group identifying mark for closing said first gate thereby introducing into said counter only the information preceding the first group identifying marks, and means controlled by said counter for introducing corrections into the average speed of said record advancing means dependent upon any variation from a normal value of the quantity of bits introduced into said counter, said scanning assembly also being responsive to a first group identifying mark and the next following mark for opening and closing respectively said second gate whereby a single complete information group is introduced into said shift register during each oscillation of said scanning assembly.

21. Digital data handling apparatus comprising means for advancing a record of serial groups of serially recorded discrete information bits separated by group identifying marks, scanning means positioned to read information and group identifying marks on said record and mounted for oscillation along the record over a distance greater than a single group of information bits, an information bit counter connected to said scanning means through a gate, means including a motor for repetitively passing said scanning means by a section of said record at a frequency approximately equal to the advance rate of said information groups and at a substantially constant velocity over the major range of displacement during passage, means for opening said gate during the substantially constant velocity of said scanning means, said scanning means being responsive to the first occurring group identifying mark for closing said gate thereby introducing into said counter only the information scanned by said scanning means preceding the first group identifying mark, and means controlled by said counter for introducing speed corrections into said record advancing means dependent upon any variation from a normal value of the quantity of bits introduced into said counter.

22. The combination in accordance with claim 21 wherein said speed correcting means comprises motor means coupled to said record advancing means for introducing an increment of retardation upon the counting of less than a predetermined number of bits preceding a first group identifying mark.

23. The combination in accordance with claim 21 wherein said speed correcting means comprises motor means coupled to said record advancing means for introducing during a single oscillation of said scanning means successive increments of retardation into said record advancing means upon the counting of less than a predetermined number of bits preceding a first group identifying mark, the number of successive increments being equal to the difference between said predetermined number of bits and the number of bits counted.

24. The combination in accordance with claim 21 wherein said motor means is coupled to said advancing means for advancing said record advance means upon the counting of more than a predetermined number of bits preceding a first group identifying mark.

25. The combination in accordance with claim 21 wherein said speed correcting means comprises motor means coupled to said record advancing means for introducing during a single oscillation of said scanning means successive increments of advance into said record advancing means upon the counting of more than a predetermined number of bits preceding a first group identifying mark, the number of successive increments being equal to the difference between said predetermined number of bits and the number of bits counted.

26. The combination in accordance with claim 21 wherein said record advancing means comprises a motor, record supply and takeup reels and a drive system coupling said motor to said takeup reels, said drive system including means for adding or subtracting increments of record advance.

27. The combination in accordance with claim 26 wherein said speed correction means is coupled to a differential in said drive system to introduce additive or subtractive increments of angular rotation into said drive system.

28. Digital data handling apparatus comprising means for advancing a record of serial groups of serially recorded information bits separated by group identifying marks, scanning means mounted for oscillation along the record over a distance greater than a single group of bits and positioned to scan the information bits and group identifying marks on the record, means connected to said scanning means for generating a pulse for each bit scanned, a multiple stage shift register connected to said scanning means through a gate, said pulse generating means connected to each stage of said shift register to provide pulses for advancing bits stored therein, an information bit counter connected to said scanning means through a gate, means including a motor for oscillating said scanning means at a frequency approximately equal to the advance rate of said information groups and at a predetermined velocity over the major range of displacement during oscillation, means for opening said gate during the predetermined velocity of said scanning means, said scanning means being responsive to the first occurring group identifying mark for closing said gate thereby introducing into said counter the information bits preceding the first group identifying mark, and means controlled by said counter for introducing speed corrections into said record advancing means dependent upon the quantity of bits introduced into said counter during each oscillation of said scanning means.

References Cited in the file of this patent

UNITED STATES PATENTS

| | | |
|---|---|---|
| 2,625,607 | Eckert | Jan. 13, 1953 |
| 2,634,052 | Block | Apr. 7, 1953 |
| 2,672,507 | Cragg | Mar. 16, 1954 |
| 2,700,155 | Clayden | Jan. 18, 1955 |
| 2,729,809 | Hester | Jan. 3, 1956 |
| 2,758,221 | Williams | Aug. 7, 1956 |